United States Patent [19]

Kiya et al.

[11] Patent Number: 4,823,274

[45] Date of Patent: Apr. 18, 1989

[54] INJECTION MOLDING MACHINE WHICH ALLOWS PROCESS MONITORING

[75] Inventors: Nobuyuki Kiya; Noriaki Neko, both of Tokyo, Japan

[73] Assignee: Fanuc Ltd, Minamitsuru, Japan

[21] Appl. No.: 185,289

[22] Filed: Apr. 18, 1988

Related U.S. Application Data

[63] Continuation of Ser. No. 885,567, Jul. 8, 1986, abandoned.

[30] Foreign Application Priority Data

Nov. 9, 1984 [JP] Japan ................. 59-235256

[51] Int. Cl.⁴ ............................................. B29C 45/76
[52] U.S. Cl. ..................................... 364/476; 364/188
[58] Field of Search ............... 364/188, 189, 476, 550, 364/558; 425/149, 169, 170, 171, 173, 145; 264/40.5, 40.1

[56] References Cited

U.S. PATENT DOCUMENTS

| | | | |
|---|---|---|---|
| 3,767,339 | 10/1973 | Hunkar | 425/149 |
| 4,030,868 | 6/1977 | Williams | 425/149 |
| 4,094,940 | 6/1978 | Hold | 364/476 |
| 4,100,598 | 7/1978 | Stiel et al. | 425/149 |
| 4,121,289 | 10/1978 | Stiel | 364/476 |
| 4,471,348 | 9/1984 | London et al. | 364/551 |
| 4,504,920 | 3/1985 | Mickowski | 364/476 |
| 4,570,229 | 2/1986 | Breen et al. | 364/476 |
| 4,589,072 | 5/1986 | Arimatsu | 364/476 |
| 4,674,053 | 6/1987 | Bannai et al. | 364/476 |
| 4,680,151 | 7/1987 | Fujita et al. | 425/149 |
| 4,695,965 | 9/1987 | Fujita et al. | 364/550 |

Primary Examiner—Allen MacDonald
Attorney, Agent, or Firm—Staas & Halsey

[57] ABSTRACT

An injection molding machine wherein the values of variables for the current and several preceding molding cycles are displayed simultaneously, so as to perform process monitoring. Detection values of the variables in the current molding cycle are stored in a current value memory section of a memory (14). Every time a molding cycle ends, a CPU (11) transfers data from the current value memory section and past variable memory sections (which store the detection values of the respective variables of several preceding steps), to the past variable memory sections for the next preceding cycles. As a result the stored data of the memory sections is sequentially updated. The updated data and the current data are read out and displayed on a display unit (18).

2 Claims, 4 Drawing Sheets

INJECTION MOLDING MACHINE WHICH ALLOWS PROCESS MONITORING

This is a continuation of co-pending application Ser. No. 885,567, now abandoned, filed on July 8, 1986.

BACKGROUND OF THE INVENTION

The present invention relates to an injection molding machine and, more particularly, to an injection molding machine which allows monitoring of the respective processes of various injection molding cycles.

Some conventional injection molding machines for repeating injection molding cycles display various data (i.e., a cycle time, an injection time, a mixing time etc.) of an immediately preceding molding cycle.

When the data display of only the preceding molding cycle is performed, however, no comparative reference is available for determining whether or not the injection molding process is proceeding correctly, and this determination must depend on the skill of an operator. Therefore, even if an injection molding machine currently executes abnormal processing, it cannot be detected immediately and a molded product of high quality cannot be obtained.

SUMMARY OF THE INVENTION

It is an object of the present invention to store various data for several preceding molding cycles, and to display transition of the data with a display means, so that an abnormality in the injection process can be found at an early stage.

In order to achieve the above object, the injection molding machine of the present invention comprises a variable detecting means for detecting values of respective variables in a molding cycle, a current value memory means for storing detection values of the respective variables in a current molding cycle, and a control means for causing the variable detecting means to read the variables and store them in the current value memory means. A past variable memory means for storing detection values of the respective variables in each of several preceding molding cycles, and an updating control means are also provided. The updating control means transfers data comprising the variables stored in the current value memory means to the past variable memory means after each molding cycle ends, thereby updating memory data in the past variable memory means. A display control means is also provided for reading the variable data from the current value memory means and for the past variable memory means, and displaying the variable data on a display unit.

As mentioned above, according to the present invention, various variables for several molding cycles preceding the current cycle are stored and displayed. Therefore, the transition of the respective variables can be easily understood from the display, and any peculiarity or abnormality in the injection molding process can thus be detected at an early stage. As a result, counter measures therefor can be taken, so that uniform molded products can be manufactured efficiently.

DESCRIPTION OF THE PREFERRED EMBODIMENTS

Figure 1:
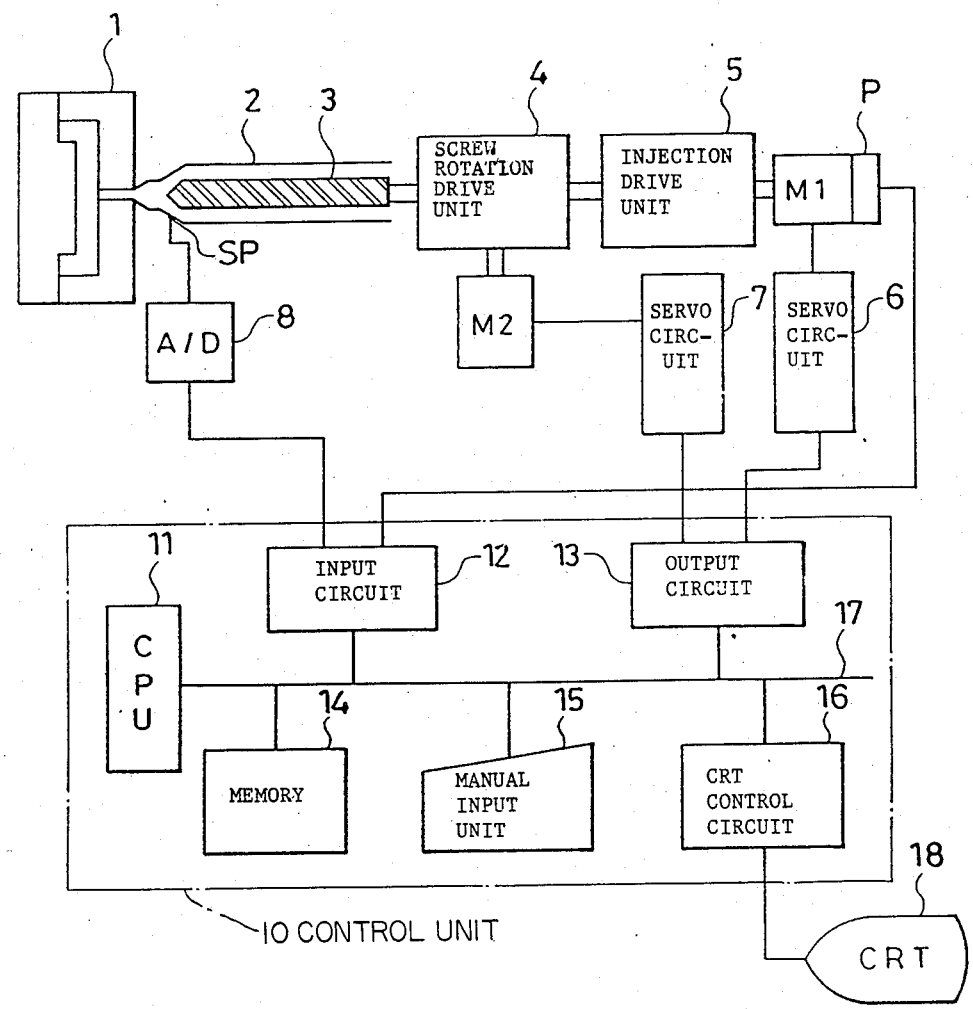
FIG. 1 is a block diagram of a main part of an injection molding machine according to an embodiment of the present invention.

FIG. 1 is a block diagram of a main part of an injection molding machine according to an embodiment of the present invention. In FIG. 1, reference numeral 1 denotes a mold; 2, a heating cylinder; and 3, a screw. A screw rotation drive unit 4 rotates the screw 3 and is driven by a servo motor M2. An injection drive unit 5 moves the screw 3 along its axial direction so as to perform injection, and is driven by a servo motor M1. A position detector P is provided on the servo motor M1. Servo circuits 6 and 7 drive the servo motors M1 and M2, respectively. A pressure detector SP detects the pressure inside the heating cylinder 2, i.e., the injection pressure. An A/D converter 8 converts the output from the pressure detector SP into a digital signal. A control unit 10 which includes a central processing unit 11 (to be referred to as a CPU hereinafter), an input circuit 12, and an output circuit 13, is also provided. A memory 14 comprises a ROM, a RAM, a non-volatile memory section, and so on. The ROM stores a control program for controlling the injection molding machine. The RAM constitutes various registers to be described later, temporarily stores various data, and executes arithmetic operations. The non-volatile memory section constitutes various counters, to be described later, and stores various display data. A manual input unit 15 is used for inputting various commands and set values. A CRT control circuit 16 controls a CRT display unit 18 to display various data. Reference numeral 17 denotes a bus.

Figure 2:
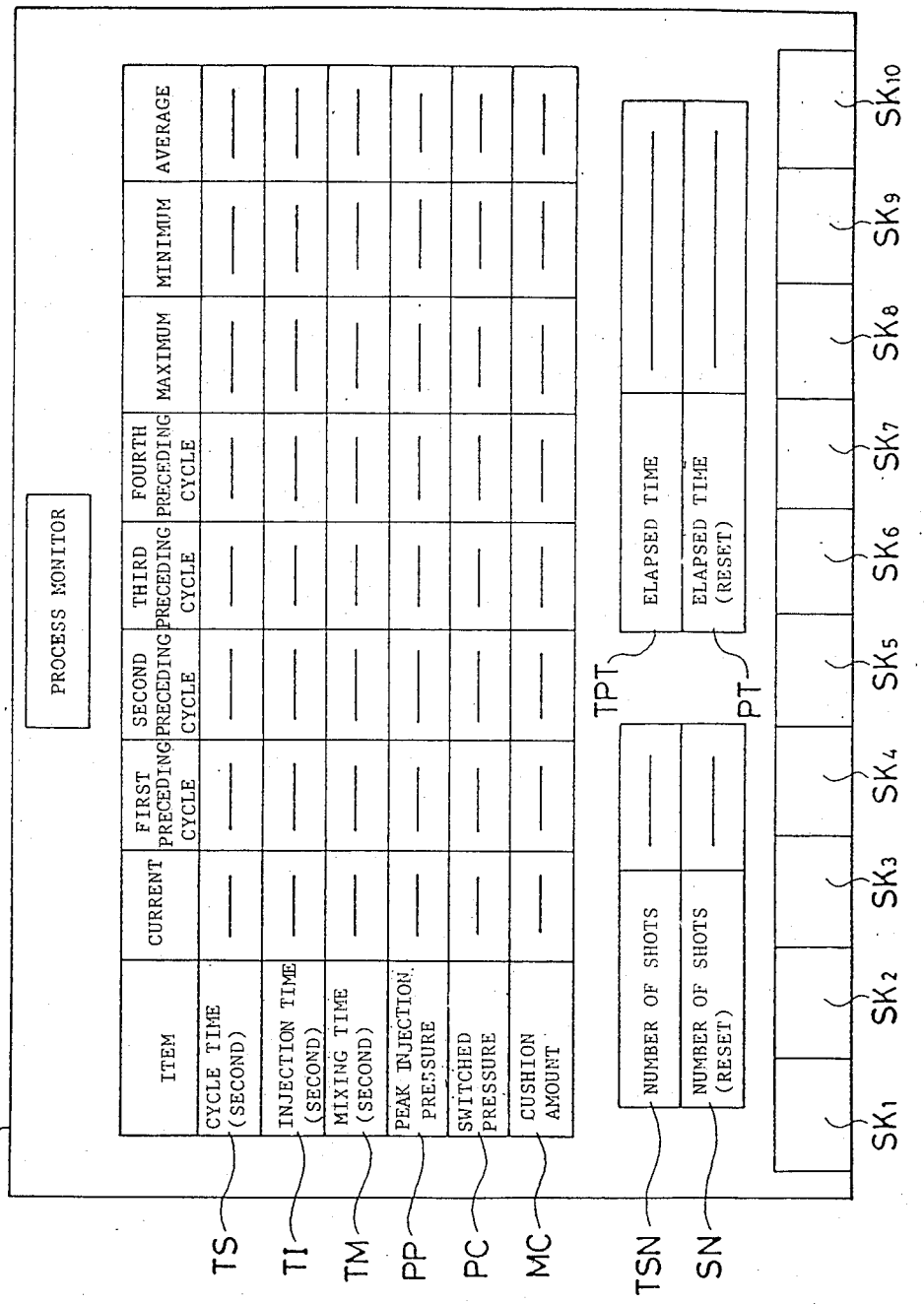
FIG. 2 is an example of a display of various variable data performed by the display unit 18 of FIG. 1.

FIG. 2 shows a screen of the CRT display unit 18, which displays process monitoring. The CRT display unit 18 displays variables of the present, i.e., the current molding cycle, as well as those of the four preceding cycles. More specifically, the CRT display unit 18 displays cycle times, injection times, mixing times, peak injection pressures, switched pressures, and cushion amounts of the five molding cycles, as well as the average value of each variable throughout the five molding cycles, and maximum and minimum values of each variable after start-up of the injection molding machine. Manual input may be made to display the number of injections (i.e., slots) SN, the total number of injections TSN, an elapsed time since reset PT, and another elapsed time TPT. The number of injections SN represents the number of injections after resetting of the apparatus upon changing, e.g., the type of resin material used. The total number of injections TSN represents the total number of injections since the installation of the injection molding machine. The elapsed time PT represents the time that has elapsed after resetting is performed by manual input. The elapsed time TPT represents the time elapsed after installation of the injection molding machine.

The data displayed on the screen of the CRT display unit 18 is sequentially stored in the non-volatile memory section in the memory 14. When a process monitor display key (i.e., as done of soft keys SK1 to SK10 on the CRT display unit 18) is depressed, corresponding data is read out from the memory 14 and is displayed, as shown in FIG. 2. Other soft keys are used to allow selection of a display mode not directly related to the present invention, and a detailed description thereof is omitted.

Figure 3:
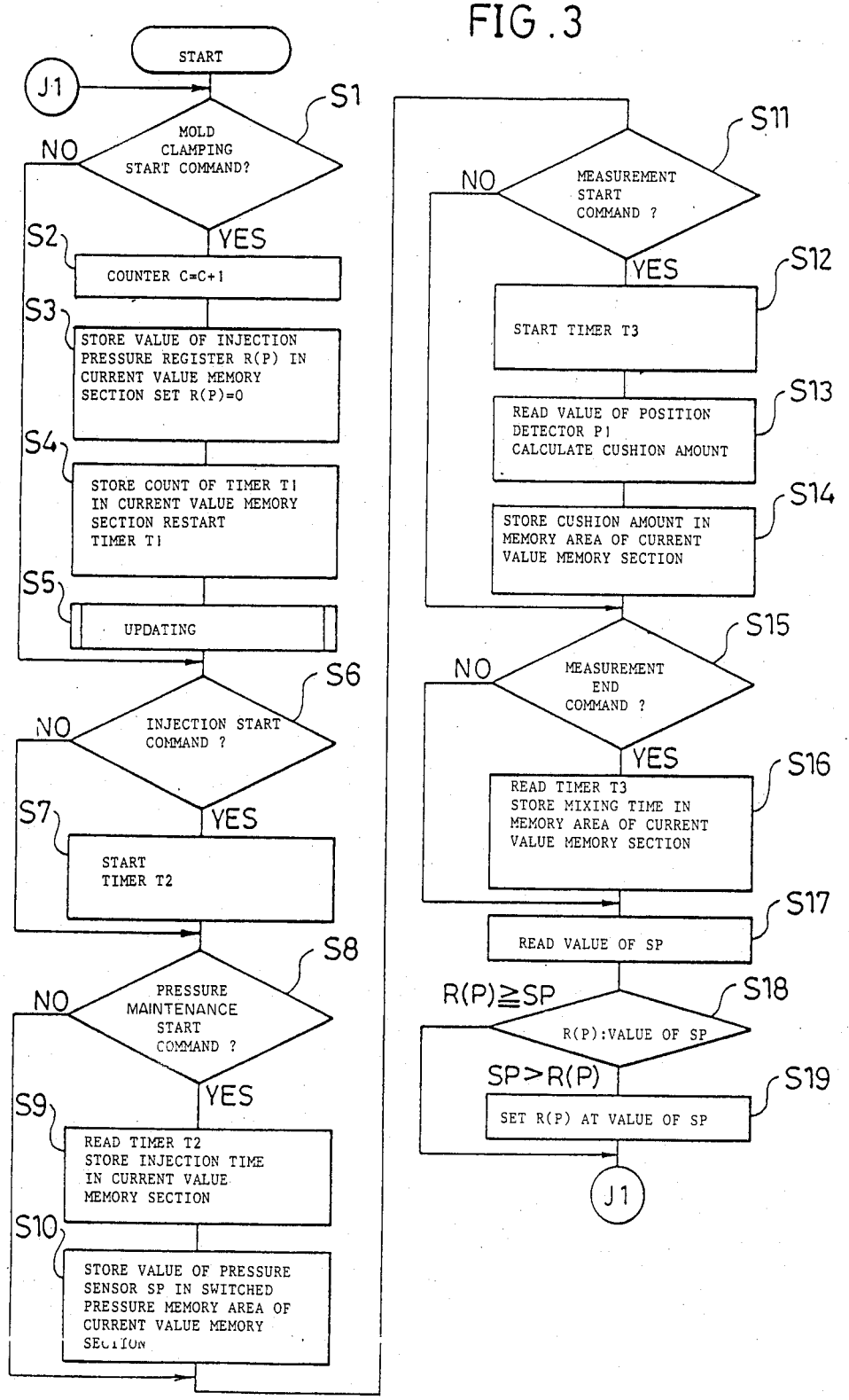
FIG. 3 is a flow chart for the operation of the unit shown in FIG. 1.
Figure 4:
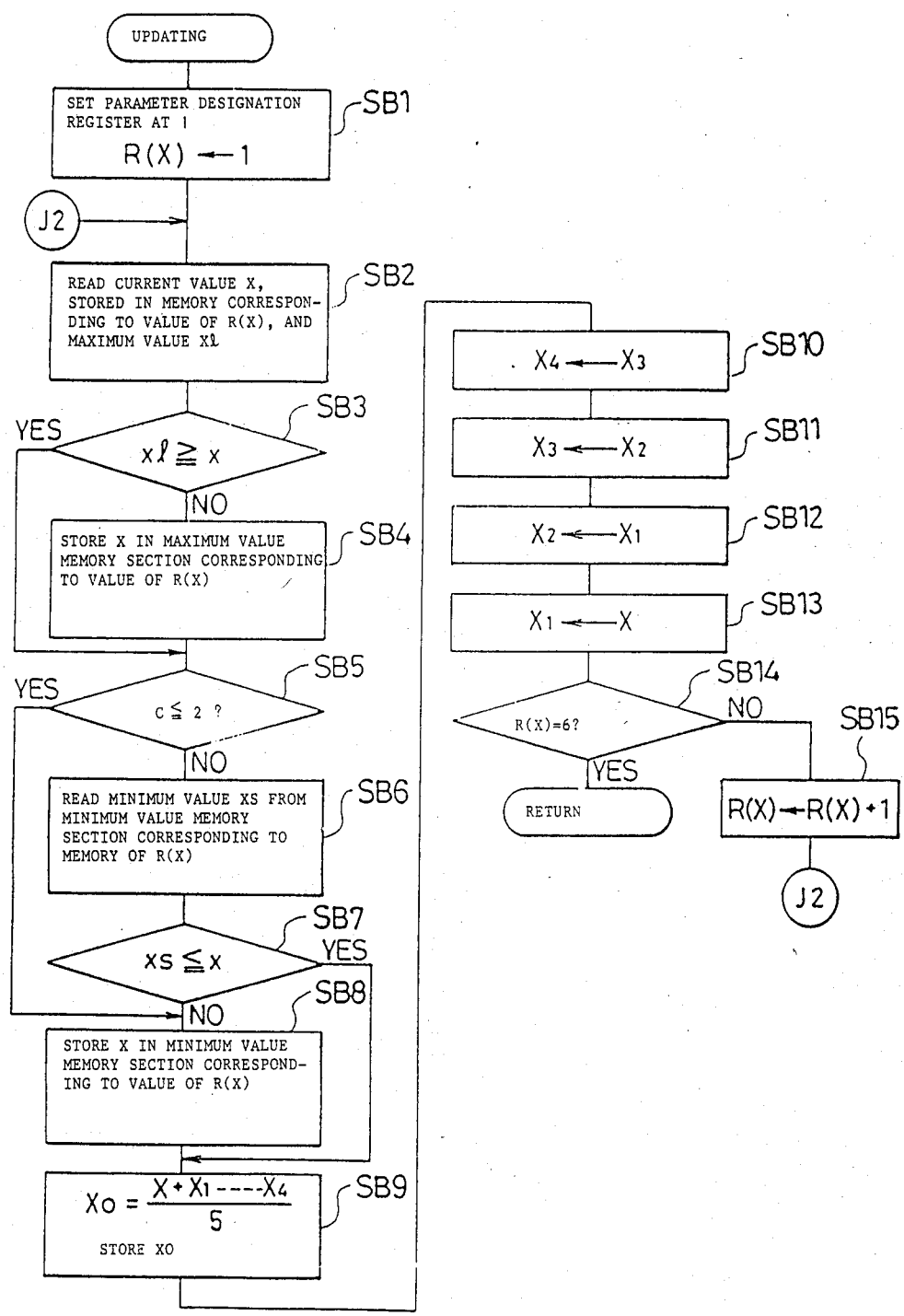
FIG. 4 is a flow chart for the updating procedure CS5 of FIG. 3.

The display operation of the injection molding machine of this embodiment will be described with reference to the operation flow charts of FIGS. 3 and 4. The CPU 11 executes the injection molding process in accordance with the control program. The CPU 11 also executes the processing shown in FIG. 3 at predetermined intervals. First, it is checked whether a mold clamping start command is output (step S1). If the command is not output, the flow advances to step S6. If the command is output, a counter C is incremented by one (step S2). The counter C is provided in the non-volatile memory section of the memory 14, can be reset by operatoin of the manual input unit 15, and counts the number of injections SN after resetting. A total counter for counting the total number of injections TSM is also provided in the non-volatile memory section of the memory 14, and performs counting together with the counter C. A peak injection pressure PP stored in an injection pressure register R(P) (to be described later) is stored in a peak injection pressure memory section storing a current value, i.e., in the memory section corresponding to the column of the "present" peak injection pressure PP on the screen of the CRT display unit shown in FIG. 2. The injection pressure register R(P) is then cleared to prepare for writing of the peak injection pressure PP in step S19, to be described later (step S3). The value of a timer T1 comprising, e.g., a software timer, is stored in a cycle time memory section for a current value, i.e., in the memory section corresponding to the column of a "current" cycle time TS. The timer T1 is then reset and started again (step S4). Note that, in the injection process of the first cycle immediately following the resetting via the manual input described above, the values of the injection pressure register R(P) and the timer T1 are 0 in steps S3 and S4. Therefore, 0s are stored as the cycle time TS and the peak injection pressure PP in the corresponding memory sections. The flow then advances to step S5 to perform updating which is shown in detail in FIG. 4. In updating, every time a molding cycle ends, the data for respective variables in that cycle is transferred to the memory section for the immediately preceding molding cycle, and processing is performed for obtaining the maximum, minimum, and average values of the updated data. Before the first molding cycle ends (before a next mold clamping start command is output), the data (the values set as the current variables in FIG. 2), for all the variables of each process is 0. Therefore, all the data updated in step S5, at which no process has yet ended, is 0. The updating will be described later in detail for the sake of easy understanding, and the description of this flow chart will continue from the next step, S6. In step S6, it is checked whether an injection start command is output. If the command is not output, the flow advances to step S8. If the command is output, a timer T2 comprising, e.g., a softward timer is started (step S7), and the flow advances to step S8. In step S8, it is checked whether a pressure maintenance start command is output. If the command is not output, the flow advances to step S11. If the command is output, the count of the timer T2 is read and written in the memory area for an injection time TI of the current value memory section (step S9). When the pressure maintenance start command is output, it indicates the end of injection, and the count of the timer T2 indicates that the injection time TI has been counted. Thus, the injection time TI of this molding cycle is stored in the memory area of the current value memory section. At this time, the value of the pressure sensor SP is read and stored in the memory section for a switched pressure of the current value memory section (step S10). In other words, the pressure at which injection is switched to pressure maintenance is stored. It is then checked whether a measurement start command is output (step S11). If the command is not output, the flow advances to step S15. If the command is output, a timer T3 comprising, e.g., a software timer, is started (step S12), and the position of the screw 3 is read from the signal from the position detector P, thereby calculating a cushion amount (step S13). When the measurement start signal is sent, it indicates that the pressure maintenance process has ended. Since the cushion amount is determined in accordance with the screw position at the end of pressure maintenance, a value corresponding to the cushion amount is stored in the cushion amount memory section of the current value memory section (step S14). It is then checked whether a measurement end command is output (step S15). If the command is not output, the flow advances to step S17. If the command is output, the count of the timer T3 is read and stored in the memory section to determine a mixing time TM of the current value memory section (step S16). The value of the pressure sensor SP is read (step S17). The read value is compared with the peak injection pressure PP up to the preceding molding cycle, which is stored in the memory section described with reference to step S3. If the read value of the pressure sensor SP is larger than the peak injection pressure PP, the read value of the pressure sensor SP is stored in the injection pressure register R(P) as the peak injection pressure PP up to the current molding cycle (step S19). Thereafer, the processing following step S1 is executed at predetermined intervals.

One molding cycle ends in the manner described above. When a mold clamping start command is output to start the next molding cycle (step S1), the processing following step S2 is executed. Before updating in step S5 is entered, the variables TS, TI, TM, PP, PC, and MC of the molding cycle just completed are stored in the current value memory section. More specifically, the cycle time TS, the injection pressure TI, the mixing time TM, the peak injection pressure PP, the switched pressure PC, and the cushion amount MC are stored in steps S4, S9, S16, S3, S10, and S14, respectively. When the current values of the respective variables are stored in the current value memory section and the flow advances to the next molding cycle, i.e., when a next mold clamping start comand is output, updating shown in FIG. 4 is executed in step S5.

First, a variable designating resiter R(x) is set at 1 (step SB1). Next, current and maximum values X and x1 of the variable, which are stored in the memory section of the memory 14 which corresponds to the variable indicated by the value of the variable designating register R(x), are read out (step SB2). More specifically, the value of the variable designating register R(x) designates a variable. Namely, when R(x)=1 is set as described above, the current value x and the maximum value x for the cycle time TS are read from the memory in step SB2. Similarly, when R(x)=2, the injection time TI is designated, when R(x)=3, the mixing time TM is designated, when R(x)=4, the peak injection pressure PP is designated, when R(x)=5, the switched pressure RC is designated, and when R(x)=6, the cushion amount MC is designated. The current value x and the maximum value x1 of each variable are then read out from the memory in step SB2. Next, the memory value x1 and the current value x are compared in step SB3. If the current value x is larger than the maximum value x1, it is set as the maximum value x1 and written in the maximum value memory section in the memory 14 (step SB4). It is then checked if the content of the counter C is 1. If the content of the counter C is 1, the flow advances to step SB8. If the content of the counter C is not 1, a minimum value xs is read out from a minimum value memory section in the memory 14, and is compared with the current value x (steps SB6 and SB7). If the current value x is smaller than the minimum value xs, it is stored in the minimum value memory section as the minimum value xs (step SB8). Note that in the first or second injection cycle (when the content of counter C is 1 or 2), the current value x in this case is automatically written in the minimum value memory section as the minimum value. Therefore, an average value x0 of values x1 to x4 in the four preceding molding cycles and the current value x of the variable is calculated and stored in an average memory section of the memory 14 (step SB9). The value X3, which is stored in the memory section for the third preceding cycle, is transferred to the memory section which stores the value x4 of the fourth preceding cycle, thereby updating its stored value. Similarly, the value x2, which is stored in the memory section for the second preceding cycle, is transferred to the memory section for the third preceding cycle. The value x1, which is stored in the memory section for the first preceding cycle, is transferred to the memory section for the second preceding cycle. The value x, which is stored in the memory section for the current cycle, is transferred to the memory section for the first preceding cycle. The stored value of each memory section is updated in this manner (steps SB10 to SB13). Subsequently, it is checked if the content of the variable designating register R(x) is 6 (step SB14). If the content of the variable designating register R(x) is not 6, it is incremented by 1 (step SB15), and the processing following step SB2 is repeated. When all the variables are updated in this manner and the content of the variable designating register R(x) becomes 6, updating ends and the flow advances to step S6 of FIG. 3.

As described above, the memory 14 sequentially stores the updated values of the respective variables of the current molding cycle and of the four preceding cycles, and the maximum, minimum, and average values thereof. In order to display these values, a process monitor display key on the CRT display unit 18 may be depressed, so that the CPU 11 reads these values from the memory 14 and displays them as data on the screen of the CRT display unit 18, as shown in FIG. 2. Regarding the elapsed time, although omitted, timers which start counting upon start of the injection molding machine are provided in the RAM and the non-volatile memory section, and the elapsed time PT and the total elapsed time TPT are counted thereby and are displayed.

What is claimed is:

1. An injection molding machine for monitoring an injection molding process during a plurality of injection molding cycles, comprising:

first detecting means for detecting a cycle time and a mixing time;

second detecting means for detecting an injection time, a peak injecton pressure and a switched pressure;

third detecting means for detecting a cushion amount;

current value memory means for storing data corresponding to a plurality of current variables including the cycle time, the mixing time, the injection time, the peak injection pressure, the switched pressure and the cushion amount for a current molding cycle;

past value memory means for storing data corresponding to a plurality of past variables including the cycle time, the mixing time, the injection time, the peak injection pressure, the switched pressure and the cushion amount for at least two preceding molding cycles, said past value memory means including a first memory section for storing the data corresponding to the plurality of past variables for a first preceding cycle, and a second memory section for storing the data corresponding to the plurality of past variables for a second preceding cycle;

a display unit;

display control means for reading data from said current value memory means and said past value memory means, and for causing data representing the current variables for the current molding cycle and the past variables for at least two preceding molding cycles to be simultaneously displayed on said display unit; and updating control means for automatically transferring the data stored in said current value memory means to said past value memory means after the current molding cycle ends, so as to automatically start and execute updating of the data in said past value memory means without manual intervention by an operator, said updating control means being operable to transfer the data stored in said current value memory means to said first memory section of said past value memory means to said first and second memory sections of said past value memory means, respectively, after each molding cycle ends.

2. An injection molding machine according to claim 1, further comprising:

means for calculating a maximum value and a minimum value for each of the cycle time, the mixing time, the injection time, the peak injection pressure, the switched pressure and the cushion amount for all molding cycles up to the current molding cycle, and for calculating an average value of the cycle time, the mixing time, the injection time, the peak injection pressure, the switched pressure and the cushion amount based on the date corresponding to the current variables for the current molding cycle and the data corresponding to the past variables for the at least two preceding molding cycles, based on the data stored in said current value memory means and said past value memory means; and means for storing the calculated maximum, minimum and average values, said display control means for reading out the calculated maximum, minimum and average values for display on said display unit.

* * * * *

UNITED STATES PATENT AND TRADEMARK OFFICE
CERTIFICATE OF CORRECTION

PATENT NO. : 4,823,274
DATED : APRIL 18, 1989
INVENTOR(S) : NOBUYUKI KIYA ET AL.

It is certified that error appears in the above-identified patent and that said Letters Patent is hereby corrected as shown below:

FRONT PAGE [63], delete this section in its entirety, and in place thereof, insert the following:

--[63] Continuation of Ser. No. 885,567, filed as PCT/JP85/00623, Nov. 8, 1985 published as WO8602879, May 22, 1986 abandoned--.

Col. 2, line 3, "CS5" should be --(S5)--;
line 64, "(i.e.,)" as done" should be --(i.e., one--.

Col. 3, line 15, "operatoin" should be --operation--;
line 58, "softward" should be --software--.

Col. 4, line 53, "resiter" should be --register--.

Col. 5, line 24, "X3," should be --x3,--.

Col. 6, line 55, "date" should be --data--.

Signed and Sealed this

Twenty-eighth Day of November 1989

Attest:

JEFFREY M. SAMUELS

Attesting Officer     Acting Commissioner of Patents and Trademarks